US008190516B2

(12) United States Patent
Ghosh et al.

(10) Patent No.: US 8,190,516 B2
(45) **Date of Patent: *May 29, 2012**

(54) EQUITY PROTECTION

(75) Inventors: Debashis Ghosh, Charlotte, NC (US); Sudeshna Banerjee, Waxhaw, NC (US); William Michael Upchurch, Carlotte, NC (US); Robert H. Eshleman, Charlotte, NC (US); Christopher James Trainor, Charlotte, NC (US); Frank B. Turner, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 12/987,758

(22) Filed: Jan. 10, 2011

(65) Prior Publication Data

US 2011/0178920 A1 Jul. 21, 2011

Related U.S. Application Data

(63) Continuation of application No. 11/750,808, filed on May 18, 2007, now Pat. No. 7,917,431.

(51) Int. Cl.
*G06Q 40/00* (2012.01)

(52) U.S. Cl. .......................................................... 705/38

(58) Field of Classification Search ............... 705/35–42
See application file for complete search history.

(56) References Cited

U.S. PATENT DOCUMENTS

| | | | | |
|---|---|---|---|---|
| 6,615,187 B1 | 9/2003 | Ashenmil et al. | | |
| 2002/0007342 A1 | 1/2002 | Sellers et al. | | |
| 2002/0103744 A1* | 8/2002 | Llewelyn | ........................ | 705/37 |
| 2003/0023462 A1* | 1/2003 | Heilizer | ........................... | 705/4 |
| 2003/0110111 A1* | 6/2003 | Nalebuff et al. | ................ | 705/35 |
| 2003/0110122 A1 | 6/2003 | Nalebuff et al. | | |
| 2003/0149659 A1* | 8/2003 | Danaher et al. | ................. | 705/38 |

(Continued)

FOREIGN PATENT DOCUMENTS

| | | |
|---|---|---|
| GB | 2424289 | 7/2004 |

OTHER PUBLICATIONS

"Building a hedge for housing", Risk Management Magazine, Dec. 1, 2002 pp. 1-2.*

(Continued)

*Primary Examiner* — Ella Colbert
*Assistant Examiner* — Mohammad Z Shaikh
(74) *Attorney, Agent, or Firm* — Banner & Witcoff, Ltd.; Michael A. Springs

(57) ABSTRACT

Systems and methods are illustrated for providing an equity protection product to a borrower of a loan. Aspects of the equity protection product may be implemented using an equity protection agreement. The equity protection product may be used to safeguard a borrower's investment in the event of a housing market downturn. In some examples, once the equity protection is purchased, the borrower's equity can only increase or remain stable (i.e., flat) regardless of market conditions. The payoff amount of the borrower's loan may be reduced to compensate for a change in the market value of the borrower's home. The equity protection product may be provided by a lending institution, bank, or any other comparable entity/person. A trading desk may also be used to hedge against the risk created by the equity protection product. In addition, an appraiser may also be used to evaluate and provide current market values of the relevant property.

27 Claims, 3 Drawing Sheets

U.S. PATENT DOCUMENTS

| | | | | |
|---|---|---|---|---|
| 2003/0212628 | A1 | 11/2003 | Kuttan et al. | |
| 2004/0073508 | A1 * | 4/2004 | Foster et al. | 705/38 |
| 2004/0158515 | A1 * | 8/2004 | Schoen | 705/35 |
| 2004/0220872 | A1 * | 11/2004 | Pollock, III | 705/38 |
| 2005/0075961 | A1 * | 4/2005 | McGill | 705/35 |
| 2005/0108028 | A1 * | 5/2005 | Arehart | 705/1 |
| 2006/0015357 | A1 * | 1/2006 | Cagan | 705/1 |
| 2006/0015364 | A1 | 1/2006 | Hays | |
| 2006/0080228 | A1 * | 4/2006 | McGill et al. | 705/38 |
| 2006/0184450 | A1 * | 8/2006 | Ely et al. | 705/38 |
| 2006/0271473 | A1 * | 11/2006 | Pollock et al. | 705/38 |
| 2007/0244780 | A1 | 10/2007 | Liu | |
| 2007/0299673 | A1 * | 12/2007 | Weyts et al. | 705/1 |
| 2008/0120226 | A1 | 5/2008 | Wegmann et al. | |
| 2008/0215479 | A1 * | 9/2008 | Pollock et al. | 705/38 |
| 2009/0234763 | A1 | 9/2009 | Stenson et al. | |

OTHER PUBLICATIONS

"Build a hedge for housing", Risk Management Magazine, Dec. 1, 2002, pp. 1-2.*

Dymi, Amilda, "Offering a Protection vs. Home Equity Devaluation; Loan Choices", Origination News. New York: Feb. 2003. vol. 12, Iss. 5; p. 10.*

Gallagher, Polyn, "Preserving Your Home's Value", Business 2.0, Feb. 2003, vol. 4 Issue 1, p. 114, pp. 1-3.*

Emre, O. Ergungor, "Home Price Derivatives", Economic Commentary (Cleveland), Jan. 15, 2007, pp. 1-6.*

Friedman, Josh, "Entrepreneur Sees a Futures Market for Homeowners; Ralph Liu is trying to start an exchange for hedging real estate. Some say the challenge would be finding enough buyers, sellers", Los Angeles Times. Los Angeles, Calif.: Apr. 20, 2003, pp. 1-4.*

Gross, Daniel; "Housing Bubble Insurance: Can you protect the value of your home when the housing market drops?", downloaded from http://www.slate.com/id/2130596/, May 14, 2007.

Christie, Les; "New Way to Bet on Real Estate; New Financial Instruments are Being Launched to Let You Wager on the Direction of Home Prices in Major Cities", CNNMoney, posted Mar. 22, 2006, downloaded from http://cnnmoney.com.

Adjustable Rate Mortgage, Wikipedia, downloaded from http://en.wikipedia.org/wiki/adjustable_rate_mortgage, May 2, 2007.

Fixed Rate Mortgage, Wikipedia, downloaded from http://en.wikipedia.org/wiki/fixed_rate_mortgage, May 2, 2007.

Mortgage Loan, Wikipedia, downloaded from http://en.wikipedia.org/wiki/mortgage_loan, May 2, 2007.

Commercial Loan, Wikipedia, downloaded from http://en.wikipedia.org/wiki/commercial_mortgage, May 2, 2007.

Housing, FAQ, CME website, file created Apr. 27, 2006, downloaded from www.cme.com.

de Aielle, Conrad; "Investing: New Hedge on Housing", International Herald Tribune, Friday, Apr. 14, 2006.

Chinese Office Action from Chinese Application No. 200880024979.9 with translation, issued Mar. 21, 2011.

Examination Report from New Zealand Application No. 581247 mailed Feb. 20, 2012.

* cited by examiner

200

EQUITY PROTECTION

CROSS-REFERENCE TO RELATED APPLICATION

This application is a continuation of copending U.S. patent application Ser. No. 11/750,808, filed on May 18, 2007, and claims priority to and the benefit of said application, which is incorporated by reference herein in its entirety and made part hereof.

FIELD OF TECHNOLOGY

Aspects of the disclosure relate to mortgage products and lending institutions. More specifically, aspects of the disclosure relate to financial products for protection against market forces.

BACKGROUND

In the current environment, homeowners and lenders have significant exposure to downside risk in home valuations. In a recent survey over seventy percent of consumers believed a collapse in the national average housing prices would occur in the coming future. Moreover, over forty percent of consumers believed home values in their local markets were likely to decline over the next few years. Given that a substantial portion of most household's income goes towards monthly mortgage payments on a home, a decrease in the value of their home is a significant concern. Moreover, record home equity lending further complicates the issue and increases overall exposure. Although a homeowner can purchase insurance to protect against loss of his/her home, the solution is not optimal. Rules and regulations governing insurance are a substantial obstacle to the offering and administration of such insurance products. Therefore, there is a need for an enhanced product for protecting homeowners and other borrowers from loss of property value.

BRIEF SUMMARY

Aspects of the present disclosure address one or more of the issues mentioned above by disclosing a techniques for protecting borrowers from monetary loss due to a decrease in the market value of their property. The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure, a method is illustrated for providing an equity protection agreement to a borrower. The method includes receiving loan information, determining the terms of the agreement using the loan information, and recording/implementing those terms in a computer system. In some embodiments, the borrower may receive regular reports informing him or her about the current market value of his/her property and current payoff amount on the loan. The payoff amount of the loan may be adjusted to take into account certain changes in the market value of the property. In addition, the borrower may pay a fee for the equity protection. The fee may be paid upfront or through various other payment means.

In some embodiment in accordance with aspects of the disclosure, a trading desk may hedge against the risk associated with the equity protection agreements by trading financial products relating to the appropriate housing index. Furthermore, an appraiser (e.g., AVM) may be used to estimate the market value of a property. The estimated market value may be used to calculate any adjustments to a borrower's loan due to the equity protection agreement.

In yet another embodiment in accordance with aspects of the disclosure, the borrower may access the various features disclosed herein over the Internet. The borrower may access a computing device of a banking center to, among other things, request an appraisal of his/her property and a display of the current payoff amount.

One skilled in the art will appreciate that one or more of the aforementioned methods and features may be embodied as computer-executable instructions stored on a computer-readable medium and executed by a processor.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the disclosure, systems and methods are illustrated for providing an equity protection product to a borrower of a loan. Aspects of the equity protection product may be implemented using an equity protection agreement. The equity protection product may be used to safeguard a borrower's investment in the event of a housing market downturn. Some first-time homebuyer prospects may not transact due to concerns over unstable home values. The inability to protect real estate investments at the consumer level is contributing to market shrinkage in the lending industry. In some examples, once the equity protection is purchased, the borrower's equity can only increase or remain stable (i.e., flat) regardless of market conditions. Such a product may provide a borrower with the peace of mind he/she needs to feel comfortable entering into a large mortgage with a bank (e.g., a retail banking center). Moreover, one or more aspects of the invention may result in mortgage loans associated with equity protection agreements being more attractive to investors (e.g., inventors in mortgage-backed securities) due to, among other things, the enhanced loan-to-value stability of the loans resulting from aspects of the invention. One of ordinary skill in the art will appreciate that the accompanying disclosure and figures describe how such an equity protection product may enhance the industry and customer satisfaction.

Figure 1:
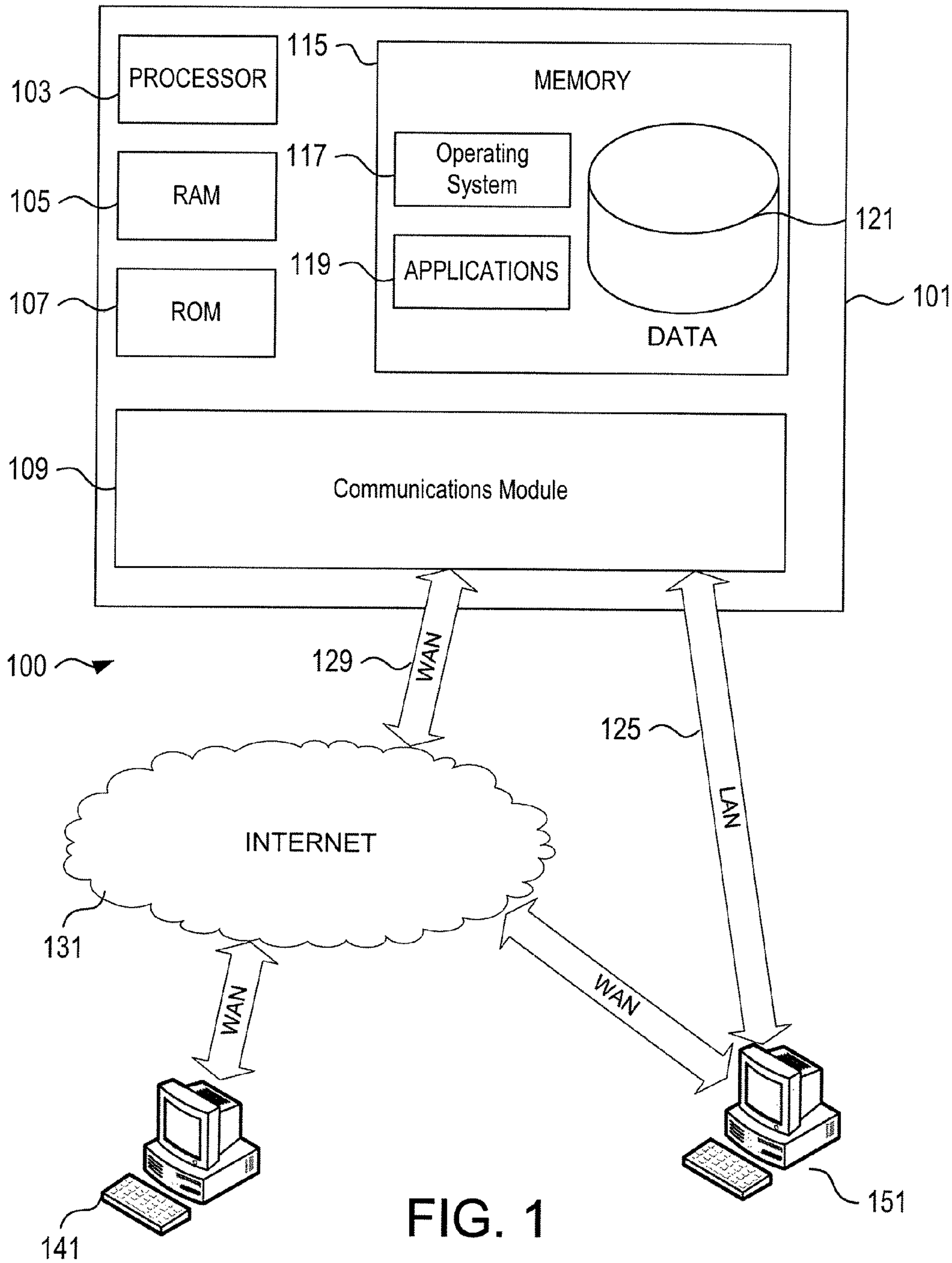
FIG. 1 illustrates a schematic diagram of a general-purpose digital computing environment in which various aspects of the disclosure may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 101. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As described in detail below, the database 121 may provide centralized storage of account information and account holder information for the entire business, allowing interoperability between different elements of the business residing at different physical locations.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computing device 101 according to an illustrative embodiment of the invention may include computer executable instructions for invoking user functionality related to communication, such as email, short message service (SMS), and voice input and speech recognition applications.

Figure 2:
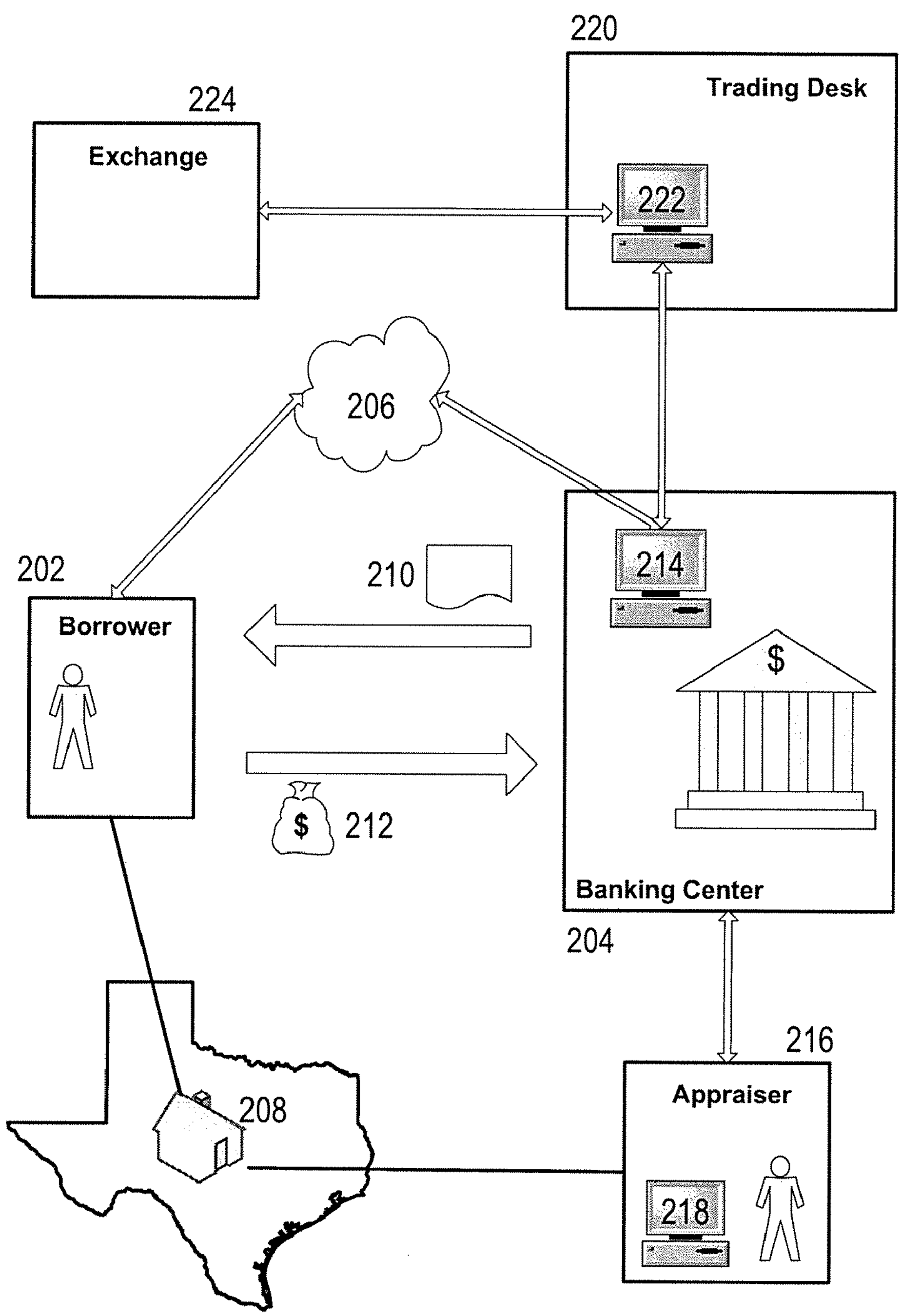
FIG. 2 shows an illustrative operating environment in which various aspects of the disclosure may be implemented.

FIG. 2 illustrates an example of a suitable operating environment in which various aspects of the disclosure may be implemented. Such a system 200 may be used to provide an equity protection agreement to a borrower. The borrower 202 may be a person (e.g., a buyer of a new home) and/or an entity (e.g., a company purchasing an office building for retail use). In one example, the borrower 202 may have a loan including a mortgage on a piece of real property 208. A banking center 204 may offer the borrower 202 an equity protection agreement 210 associated with the loan. The terms of the equity protection agreement 210 may guarantee the borrower's equity in the real property 208 in exchange for a fee 212. The equity protection agreement 210 may be provided by any person, entity, and/or thing interested in providing the borrower 202 with protection against loss in the equity of an asset due to market fluctuations, and need not necessarily be provided by just a bank. The borrower 202 may be required to pay the banking center 204 a fee 212, which may be structured in one of many various forms, for the equity protection agreement 210. As a result, if the market value of the real property 208 decreases, the payoff amount of the loan may be reduced to maintain the equity of the borrower 202.

The system 200 may comprise one or more computing device 214, 218, 222 to assist in implementing various aspects of the disclosure. As explained in detail with reference to FIG. 1, the computing devices 214, 218, 222 of FIG. 2 may comprise similar components as those show in computing device 101, including but not limited to a processor, memory, communications module, and/or other components in accordance with aspects of the disclosure. For example, the banking center 204 may comprise a computing device 214 configured to adjust information corresponding to the borrower's loan based on, among other things, the market value of the real property 208. One example of information corresponding to the borrower's loan is the payoff amount. The computing device 214 may adjust the payoff amount of the loan based on changes in the market value of the real property 208.

The market value of an asset (e.g., real property) may be determined by an appraiser 216 using predetermined criteria. In on example, the appraiser 216 may be a person certified to appraise real estate. Alternatively, the appraiser 216 may be a computing device 218 including software for an automated valuation model ("AVM"). Automated valuation models are well known to those of skill in the art. The AVM may estimate the market value of an asset using predetermined criteria. For example, the AVM may use market comparison data of similar types of homes sold in similar markets as a criteria in determining current market value. In the example of a commercial property, the AVM may use cash flow or rental rates as criteria in determining current market value of the property. In another example, the predetermined criteria may be based on at least one or more of a sales comparison approach, cost approach, and/or income approach, as well-known to those of skill in the art. Numerous other examples of criteria used by an appraiser 216 will be apparent to one skilled in the art after review of the entirety disclosed herein.

In addition, referring to FIG. 2, computing device 214 may store computer-executable instructions that are executed by a processor. The computer-executable instructions may cause a processor 103 in computing device 214 to perform a method including the steps of: receiving information corresponding to a borrower's loan (e.g., a loan officer at the banking center 204 may enter loan information into the computing device 214); receiving a property's market value (e.g., a loan officer reads an appraisal report stating the current market value of the property and enters the value into the computing device 214); determining a fee (e.g., fee amount, fee structure, payment plan, etc.) and/or other terms of an equity protection agreement; recording the loan information and terms of an equity protection agreement in memory; adjusting the loan information (e.g., payoff amount) in accordance with changes in the property's market value that are reported to the banking center 204; and outputting the payoff amount of the loan for display to a user. In one example, the user may be a borrower 202, or a loan officer at a banking center 204. In another example, the borrower 202 may request that an appraisal and subsequent adjustment be done to account for suspected changes in market value.

In addition, computing device 214 may be accessible to the borrower 202 through a network 206 (e.g., the Internet 131, a telecommunications network, Wi-Fi, LAN, WAN, etc.). In such embodiments, the computing device 214 may behave similar to a web server by providing the borrower 202 with access to a banking website where the borrower 202 can securely login and review information about his/her mortgage loan and/or equity protection agreement 210. For example, the borrower 202 may request the website output information about the payoff amount of the loan, the status of a monthly loan payment, and access other banking functions well known to those of ordinary skill in the art. In addition, the borrower 202 may use the site to request that an appraisal be performed on his/her property 208 and that any change in the market value of the property 208 be identified. In one example, enforcement of the equity protection agreement 210 may result in the borrower's payoff amount being reduced to compensate for the decrease in the property's market value. The terms of an equity protection agreement 210 may provide a limit on the number of times that a borrower may request an appraisal and adjustment of his/her property.

Referring to FIG. 2, an illustrative system 200 may also include a trading desk 220 to hedge against risk associated with the equity protection agreement 210. The trading desk 220 may include a trading terminal (e.g., computing device 222) configured to trade a financial product (e.g., securities, options futures, swaps, etc.) based on a housing index associated with a region (e.g., zip code, city/town, state, nation, etc.) containing the real property 208. Such a product may be a derivative product that may be bought and sold from an exchange 224. For example, a banking center 204 may communicate to a trading desk 220 the extent of its exposure to risk in a particular market. The trading desk 220 may act accordingly to reduce the risk created by the equity protection agreement 210. In one instance the trading desk 220 may take a long or short position on the Case-Shiller index for the particular region involved. Alternatively, if a Case-Shiller or similar housing index is not available for a particular region, a comparable housing index may be substituted and processed accordingly. In another example, a national housing index may be used to complement or supplement the absence of a regional housing index.

Figure 3:
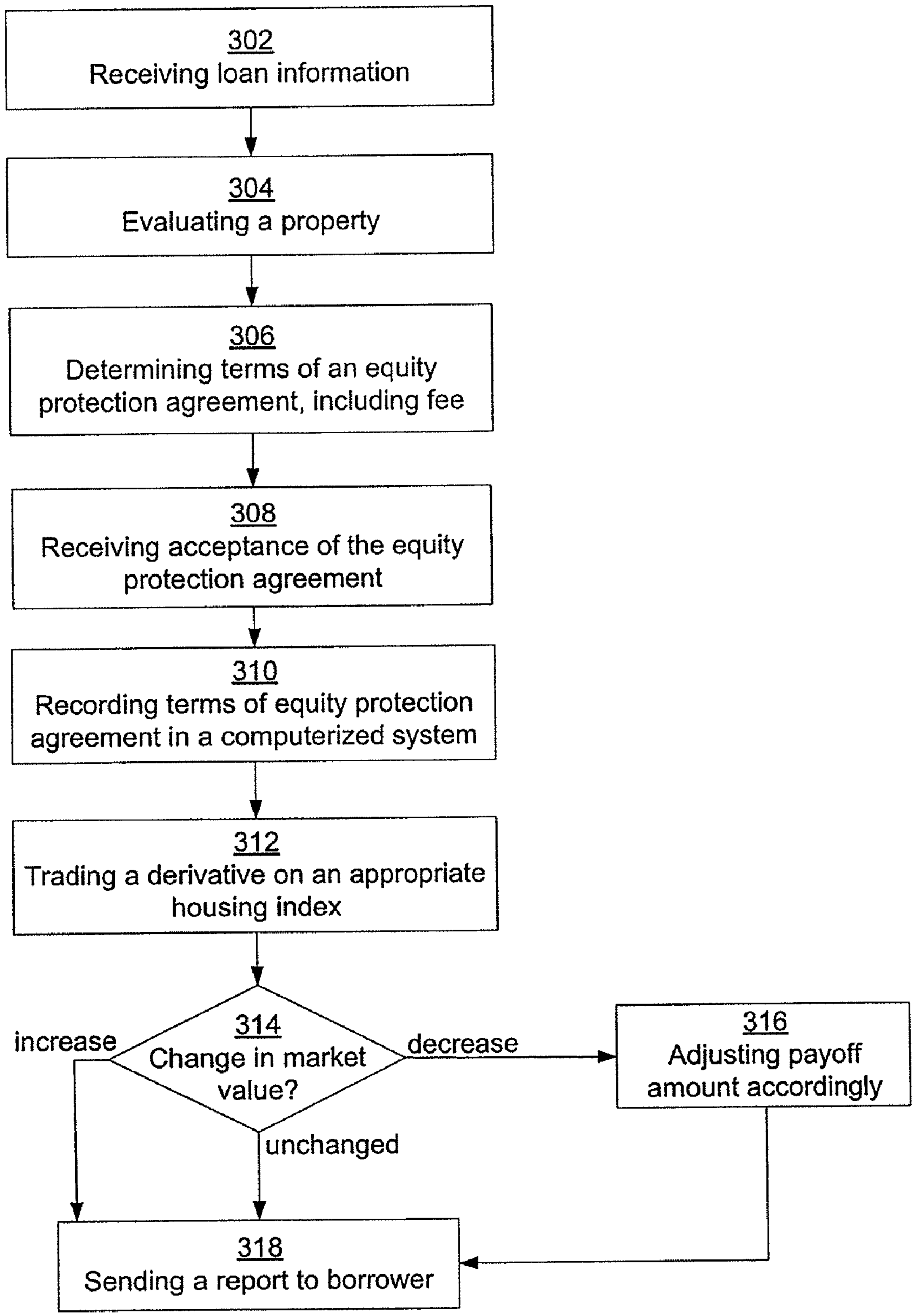
FIG. 3 shows an illustrative method for providing an equity protection agreement to a borrower in accordance with various aspects of the disclosure.

Referring to FIG. 3, a method for providing an equity protection agreement 210 to a borrower 202 is illustrated. The equity protection agreement 210 may be provided by any person, entity (e.g., banking center 204), and/or thing interested in providing a borrower 202 with protection against loss in the equity of an asset due to market fluctuations. Some examples of assets that may be protected in accordance with aspects of the invention include, but are not limited to, antiques, collectibles (e.g., paintings, rare coins, memorabilia, etc.), residential property, commercial property, etc.).

Referring to FIG. 3, in step 302, a banking center 204 may receive loan information corresponding to the loan of the borrower 202. The loan information may comprise a unique identifier of a property (e.g., real property 208) corresponding to the loan, the borrower's equity in the property, a payoff amount of the loan, and/or any other information related to the loan. The unique identifier of the property 208 may include its street address and zip code. In another example, the unique identifier may include the longitude and latitude of the property 208. The borrower's equity in the property may correspond to the borrower's ownership interest in the property. For example, if a borrower takes out a mortgage on a new home with a purchase price of $300,000 and submits $7,500 as a down payment, the borrower's equity in the home at closing may be $7,500. The payoff amount of the loan would be the total in principal and interest (and in some cases, other additional costs and expenses) that the borrower must pay to terminate the loan.

In step 304, the banking center 204 may direct an appraiser 216 to evaluate the property using predetermined criteria to estimate the property's initial market value. In one example, the appraiser 216 may be a partner of or a division of the banking center 204. The evaluation process may occur at various times during the loan application and/or approval process. For example, the evaluation may be performed during as an underwriting step during the loan application process. In such cases, the appraised market value may be used by (or slightly modified) a banking center 204 to evaluate the property. Alternatively, automated valuation models ("AVMs") may be used to determine the market value. After a predetermined period of time, the AVM may reevaluate (either automatically or upon request from the borrower 202 and/or banking center 204) the value of the property and the system 200 may react accordingly.

Referring to step 306, the banking center 204 may determine the terms of the equity protection agreement 210. Although the disclosure contemplates the equity protection agreement 210 potentially including any contractual terms known to those of ordinary skill in the relevant arts, some illustrative terms include, but are not limited to: an exclusionary period (e.g., a limitation on the number of (or frequency of) times a borrower may request an appraisal and/or adjustment, etc.), a plurality of events (or types of events) excluding from protection coverage under the agreement, base assumption regarding the valuation of the property at the time of the agreement (e.g., the property's initial market value), and/or various fee structures for describing the borrower's method of payment.

In one example, the terms of the agreement may include an exclusionary period. The exclusionary period may be a predetermined amount of time during which borrower may not make a claim for a decrease in the market value of a property 208. For example, the exclusionary period may be the first three years after entering into the equity protection agreement 210. In another example, the exclusionary period may include a restriction on the number of times (or the frequency of times) a borrower 202 may request an appraisal and/or adjustment of his or her loan. At least one benefit of such a term is to limit the administrative burden and cost of repeat claims from a borrower for miniscule adjustments over a short period of time. In addition, a computing device 214 of a banking center 204 may be configured to not adjust the loan information based on a change in the market value of a property 208 if the adjustment would fall within an exclusionary period. In one example, the exclusionary period may be implemented using programming logic in software (e.g., computer-executable instructions stored on a computer-readable medium) executing on the computing device 214.

In another example, the terms of the agreement may include a plurality of events (or types of events) excluded from the equity protection agreement 210. For example, events that are acts of God, such as hurricanes, earthquakes, floods, typhoons, tornadoes, storms, and other natural disasters, may be excluded from protection under the agreement 210. In another example, a loss due to lack of maintenance of the asset may be excluded from protection. In addition, any loss to the asset in excess of normal wear and tear may be excluded from protection as well, subject to an appraiser's evaluation. Any loss in market value of a property due to these excluded events (or types of events) might not result in an adjustment to the borrower's loan. In addition, a computing device 214 of a banking center 204 may be configured to not adjust the loan information based on a change in the market value of a property 208 if the adjustment was substantially caused by an excluded event (or type of event). In one example, such an aspect of the agreement 210 may be implemented using programming logic in software (e.g., computer-executable instructions stored on a computer-readable medium) executing on the computing device 214.

In yet another example, the terms of the agreement 210 may include one or more of the various fee structures that may be used to describe the borrower's means of payment. In one example, the fee 212 may be fixed at a predetermined percentage (e.g., 1 percent) of the loan balance and paid upfront (i.e., at the time of entering into the agreement 210) entirely. Alternatively, the fee 212 could be percentage of the borrower's equity invested. In such an example, the mortgage transaction may benefit from, among other things, non-interest rate sensitive revenue diversification. In another example, the fee 212 due may be divided and paid monthly along with the loan mortgage payments. At least one benefit of such an installment payment arrangement is that the borrower's burden of paying the fee 212 is spread over a period of time.

In yet another example, the fee 212 may be paid through a predetermined increase (e.g., 1 percent) in an annual percentage rate of the borrower's corresponding loan. In the example where the loan is a fixed rate mortgage, the new annual percentage rate of the loan over the lifetime of the loan may be constant. Alternatively, in the example where the loan is an adjustable rate mortgage, the annual percentage rate of the loan may fluctuate over the lifetime of the loan. In such a scenario, although the annual percentage rate of the loan may change over the lifetime of the loan, the percentage allocated to the payment of the fee 212 may remain constant. Alternatively, the percentage rate allocated to the fee 212 may also fluctuate.

Moreover, the fee 212 corresponding to the equity protection agreement 210 may be calculated, in one example, based on a multivariate model using internal data and/or external data. Examples of internal data include, but are not limited to, one or more of: customer counts, migration data for individuals/entities, and/or other data internal to a lending institution. Examples of external data include, but are not limited to, one or more of census bureau data, local area unemployment statistics, Case-Shiller home price indices values, and/or other data external to a lending institution.

Referring to step 308, the banking center 204 may present the equity protection agreement 210 to a borrower 202 and receive acceptance of the terms of the agreement 210. In one example, the banking center 204 may offer the borrower 202 an equity protection agreement 210 at the same time as it approves the borrower 202 for a line of credit (e.g., a mortgage loan). In such a scenario, the borrower 202 may be required to enter into the agreement 210 on the same day (e.g., same business day) as it enters into the mortgage loan. Alternatively, the equity protection agreement 210 may be offered at one or more times in the loan processing/approval and/or over the lifetime of the loan. In another example, an independent corporation may be banking center 204 and provide equity protection agreements to any bank's borrowers. In yet another example, the equity protection agreement 210 may be provided by the seller of a home to the buyer of the home. One of ordinary skill in the art will appreciate that there are numerous other entities that may offer an equity protection agreement to a borrower in accordance with various aspects of the invention.

Referring to step 310, the banking center 204 may record the terms of the equity protection agreement 210 in a computerized system. The computerized system may include computing device 214, which as been described in great detail throughout the disclosure. One skilled in the art will appreciate that the act of recording the terms of the agreement 210 includes the process of executing software on a computing device 214 to implement the restrictions (e.g., exclusionary period, etc.) of the agreement 210. Furthermore, recording may include writing to a memory in the computerized system one or more of the loan information and/or other values (e.g., the initial market value of the property). The computerized system (e.g., computing device 214) may be configured to receive the property's 208 market value as an input and to adjust the loan information based on at least the input. The system may (in step 316) adjust the payoff amount of the loan based on a change in the property's market value, as determined in step 314. The payoff amount may be decreased if the change resulted in a decrease in the market value of the property 208. However, if there was an increase or no change in the market value of the property 208, the payoff amount might not be adjusted to reduce the borrower's 202 loan.

For example, four years after entering into an equity protection agreement 210 with a banking center (e.g., bank, financial institution, etc.) 204, a borrower 202 may request an appraisal of the property 208 covered under the agreement 210. Assume for purposes of the example that the borrower 202 purchased the property 208 for $150,000. Also assume that the borrower 202 paid a down payment of $20,000 and took out an initial mortgage loan for the remaining amount (i.e., $130,000) of the purchase price. Further assume the borrower 202 paid an upfront fee 212 of one percent of the loan amount (i.e., $1,300) for the equity protection agreement 210. Also assume that the borrower 202 has paid off $10,000 of the principal amount of the initial loan during the first four years. Therefore, the payoff amount (assuming no additional interest payments or other additional costs and expenses) is $120,000. In addition, assume that now (i.e., four years later), an appraiser 216 values the property 208 at only $145,000 due to a general downturn in the housing market in the area where the property 208 is located. In other words, the property 208 has experience a decrease in market value of $5,000. In accordance with aspects of the disclosure, the equity protection agreement 210 would result in the payoff amount of the loan being adjusted from $120,000 to $115,000. In one embodiment in accordance with aspects of the disclosure, the coverage amount of the equity protection agreement 210 may be set to the amount of the borrower's 202 initial equity in the property 208. In one example, the initial equity equals the amount of the down payment (i.e., $20,000).

Therefore, in response to the borrower's 202 request, the banking center 204 may report to the borrower 202 that his property 208 is now valued at $145,000 and that his payoff amount for the loan has been reduced to $115,000. The report may also, in some embodiments, include the criteria the appraiser 216 used to value the property 208. In another example, the report may be provided to the borrower 202 on an automatic basis at predetermined intervals of time (e.g., an annual report on the current market value of the property and adjusted payoff amount.) In the event that the market value of a property 208 has decreased by more than the payoff amount of a loan (i.e., the remaining balance to payoff the loan), the payoff amount of the loan may be adjusted to zero. Alternatively, the banking center 204 may provide alternate compensation to the borrower 202 according to the terms of the equity protection agreement 210.

Referring to FIG. 3, in step 312 the banking center 204 may coordinate with a trading desk 220 to trade a financial product (e.g., an option, futures contract, etc.) on a housing index (e.g., the Case-Shiller index) associated with a region containing the real property 208. As explained earlier, the trading desk 220 may be used to hedge the banking center's 204 exposure to risk associated with the equity protection agreement 210.

In yet another example in accordance with various aspects of the disclosure, all or a portion (e.g., twenty-five percent) of the fee 212 may be returned to the borrower 202 if the borrower 202 does not receive a payoff amount reduction in his or her loan within a predetermined time (e.g., 10 years) after accepting the equity protection agreement 210. For example, four years after entering into an equity protection agreement 210 with a banking center (e.g., bank, financial institution, etc.) 204, a borrower 202 may request an appraisal of the property 208 covered under the agreement 210. Assume for purposes of the example that the borrower 202 purchased the property 208 for $150,000. Also assume that the borrower 202 paid a down payment of $20,000 and took out an initial mortgage loan for the remaining amount (i.e., $130,000) of the purchase price. Further assume the borrower 202 paid an upfront fee 212 of one percent of the loan amount (i.e., $1,300) for the equity protection agreement 210. Also assume that the borrower 202 has paid off $10,000 of the principal amount of the initial loan during the first four years. Therefore, the payoff amount (assuming no additional interest payments and no other additional costs and expenses) is $120, 000. In addition, assume that now (i.e., four years later), an appraiser 216 values the property 208 at only $155,000 due to a healthy housing market in the area where the property 208 is located. In other words, the property 208 has experience an increase in market value of $5,000. In accordance with aspects of the disclosure, the equity protection agreement 210 might not result in the payoff amount of the loan being adjusted. Rather, a percentage (e.g., twenty-five percent) of the fee amount may be returned to the borrower 202 at that time. In this example, such an amount returned is $325 (i.e., 25% of $1,300).

Other aspects of the disclosure that are contemplated by the disclosure include features directed to: potential options for risk offset, diversifying geographically, offloading through securitization, future markets, REITs, etc., and placing caps or limit losses through exclusions, and minimizing exposure through reinsurance. Furthermore, an automatic saving feature may also be implemented in accordance with aspects of the disclosure. In one example, the borrower's 202 monthly mortgage payment may be rounded up to the next whole dollar amount (e.g., $359.35 may be rounded-up to $360). The amount rounded-up (e.g., for a rounding up of $359.35 to $360, the amount rounded-up is $0.65) may be deposited in a savings account. The amount may be returned to the borrower 202 at some later time. At least one benefit of such a feature is the savings that occur for the borrower 202, such that the borrower 202 has funds saved for the future.

Although illustrative embodiments in accordance with aspects of the disclosure is disclosed above, it should be appreciated that a computer system, as depicted in FIGS. 1 and 2, is not necessary in all embodiments of the disclosure. Rather, aspects of the disclosure, including recording of the terms of the equity protection agreement and loan information, may be implemented without the use of such a computer system. For example, one or more method claims recited below do not necessarily require the technological arts of a computer system in order to be performed.

Although not required, one of ordinary skill in the art will appreciate that various aspects described herein may be embodied as a method, a data processing system, or as a computer-readable medium storing computer-executable instructions. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A computer-assisted method, comprising:

(a) receiving loan information corresponding to a loan of a borrower, at a computerized system, the loan information including a unique identifier of a property corresponding to the loan; and (b) recording terms of an equity protection agreement in the computerized system, the equity protection agreement having terms including an initial market value of a property corresponding to the loan, wherein the equity protection agreement has been accepted by the borrower, the computerized system configured to receive the property's market value as an input and to adjust the loan information according to the terms of the equity protection agreement at a predetermined interval of time based on at least the input.

2. The method of claim 1, the property comprising real property, the loan including a mortgage on the real property, and the unique identifier of the real property comprising a street address.

3. The method of claim 2, comprising:

sending the borrower a report at a predetermined interval, the report comprising the property's market value at a particular time.

4. The method of claim 3, the report including a payoff amount output from the computerized system, the computerized system configured to adjust the payoff amount based on a change in the property's market value.

5. The method of claim 4, the payoff amount being adjusted to zero if the property's market value has decreased by more than the payoff amount.

6. The method of claim 1, further comprising:

trading at a trading terminal a financial instrument of an index including at least the property to hedge against risk.

7. The method of claim 6, where the trading the financial instrument includes: trading an option on a housing index associated with a region containing the real property to hedge against risk associated with the equity protection agreement.

8. The method of claim 1, further comprising:

determining the terms of the equity protection agreement, wherein the terms further include a fee.

9. The method of claim 8, wherein determining terms of the equity protection agreement includes evaluating the property using an automated valuation model.

10. The method of claim 8, wherein the fee of the equity protection agreement is divided and a portion of the fee is due monthly with loan payments, and where the fee is returned to the borrower if the borrower does not receive a payoff amount reduction within a predetermined time after accepting the equity protection agreement.

11. The method of claim 8, wherein the fee of the equity protection agreement is paid through a predetermined increase in an annual percentage rate of the loan.

12. The method of claim 8, where the determining terms of the equity agreement includes evaluating the property based on at least a value of a housing index associated with a region containing the real property.

13. The method of claim 1, wherein the predetermined interval of time is one year.

14. The method of claim 1, wherein the computerized system is configured to provide a website, further comprising:

receiving, through the website at the computerized system, a request from the borrower that an appraisal be performed on the property and any change in the property's market value be identified to the borrower.

15. An apparatus, comprising:

a memory storing computer-executable instructions;

a processor configured to execute the computer-executable instructions to cause the apparatus to perform a method comprising:

(a) receiving loan information corresponding to a loan of a borrower, the loan information including a unique identifier of a property corresponding to the loan;

(b) recording terms of an equity protection agreement in the memory, the equity protection agreement having terms including an initial market value of a property corresponding to the loan, wherein the equity protection agreement has been accepted by the borrower; and (c) receiving the property's market value as an input and adjusting the loan information according to the terms of the equity protection agreement at a predetermined interval of time based on at least the input.

16. The apparatus of claim 15, wherein the processor is configured to execute the computer-executable instructions to further perform:

outputting a report configured for sending to the borrower, at a predetermined interval, the report comprising the property's market value at a particular time.

17. The apparatus of claim 16, the report including a payoff amount for the loan, wherein the processor is configured to execute the computer-executable instructions to further perform:

adjusting the payoff amount based on a change in the property's market value.

18. The apparatus of claim 17, the payoff amount being adjusted to zero if the property's market value has decreased by more than the payoff amount.

19. The apparatus of claim 15, wherein the predetermined interval of time is one year.

20. A computer-assisted method, comprising:

(a) receiving, at a computerized system, mortgage information corresponding to a mortgage of a property, the information including a payoff amount of the mortgage;

(b) receiving, at the computerized system, terms of an equity protection agreement that has been accepted by a borrower associated with the mortgage, the terms including a market value of the property;

(c) recording the mortgage information and the terms of the equity protection agreement in the computerized system;

(d) at a predetermined interval of time, adjusting the payoff amount of the mortgage according to a decrease in the property's market value, using the computerized system; and (e) outputting the adjusted payoff amount of the mortgage for display to the borrower, using the computerized system.

21. The method of claim 20, further comprising:

receiving, through a website provided by the computerized system, a request from the borrower that an appraisal be performed on the property and any change in the property's market value be identified to the borrower.

22. The method of claim 20, the payoff amount being adjusted to zero if the property's market value has decreased by more than the payoff amount.

23. The method of claim 20, further comprising:

trading at a trading terminal a financial instrument of an index including at least the property to hedge against risk.

24. The method of claim 23, where the trading the financial instrument includes: trading an option on a housing index associated with a region containing the real property to hedge against risk associated with the equity protection agreement.

25. An apparatus, comprising:

a memory storing computer-executable instructions;

a processor configured to execute the computer-executable instructions to cause the apparatus to perform a method comprising:

(a) receiving mortgage information corresponding to a mortgage of a property, the information including a payoff amount of the mortgage;

(b) receiving terms of an equity protection agreement that has been accepted by a borrower associated with the mortgage, the terms including a market value of the property;

(c) recording the mortgage information and the terms of the equity protection agreement in the memory;

(d) at a predetermined interval of time, adjusting the payoff amount of the mortgage according to a decrease in the property's market value; and (e) outputting the adjusted payoff amount of the mortgage for display to the borrower.

26. The apparatus of claim 25, wherein the processor is configured to execute the computer-executable instructions to further perform:

receiving, through a website provided by the apparatus, a request from the borrower that an appraisal be performed on the property and any change in the property's market value be identified to the borrower.

27. The method of claim 25, the payoff amount being adjusted to zero if the property's market value has decreased by more than the payoff amount.

* * * * *